United States Patent
Reuter et al.

(10) Patent No.: US 7,019,688 B1
(45) Date of Patent: Mar. 28, 2006

(54) LAAS GROUND FACILITY SIGMA MONITOR

(75) Inventors: Randy J. Reuter, Brooklyn Park, MN (US); Mats Brenner, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/089,156

(22) Filed: Mar. 24, 2005

(51) Int. Cl.
H04B 7/185 (2006.01)

(52) U.S. Cl. .................................... 342/357.03

(58) Field of Classification Search ............. 342/34, 342/37, 173, 357.02, 357.03, 357.06; 701/207, 701/213
See application file for complete search history.

(56) References Cited

U.S. PATENT DOCUMENTS

| | | | |
|---|---|---|---|
| 6,332,070 B1 | 12/2001 | Bochmann et al. | 422/12.1 |
| 6,347,113 B1 | 2/2002 | Hatch | 375/149 |
| 6,380,888 B1 | 4/2002 | Kucik | 342/357.03 |
| 6,392,589 B1 | 5/2002 | Rogers et al. | 342/357.03 |
| 6,429,808 B1 | 8/2002 | King et al. | 342/357.02 |
| 6,559,793 B1 | 5/2003 | Eschenbach | 342/357.03 |
| 6,847,893 B1* | 1/2005 | Lupash | 701/213 |
| 2002/0062193 A1 | 5/2002 | Lin | 701/208 |
| 2002/0167441 A1 | 11/2002 | McBurney et al. | 342/357.03 |

OTHER PUBLICATIONS

Braff, Ronald, "LAAS Perfomance for Terminal Area Navigation" The MITRE Corporation Center for Advanced Aviation System Development (CAASD), McLean, VA 22102.

Frank van Grass, Ph.D. "Development and Applications of Satellite-Based Services" Avionics Engineering Center, School of Electrical Engineering and Computer Science, Russ College of Engineering and Technology, Ohio University, Athens, Ohio. Aug. 2000.

Hartman, Randy "Precision Approach Using Differential GPS" Honeywell.

Miller, Jim, "LAAS Government Industry Partnership".

Lamb, Dave et al., "Development of Local Area Augmentation System Siting Criteria".

Lee, Jiyun, et al. "LAAS Sigma-Mean Monitor Analysis and Failure-Test Verification" Printed from http://WAAS.Stanford.edu/~wwu/papers/gps/PDF/jiyunionam01.pdf. on Dec. 17, 2003.

Lewison, George, "Honeywell's Differential GPS Satellite Landing System" Avionic News, Sep. 1996.

Normark, Per-Ludvig, "Ground Facility Prototype Development to Support High-Integrity Aircraft Approach and Landing Using GPS" Stanford University Spring 2001.

(Continued)

Primary Examiner—Dao Phan
(74) Attorney, Agent, or Firm—McDonnell Boehnen Hulbert & Berghoff LLP

(57) ABSTRACT

A 1-sigma pseudorange ground monitor (sigma monitor) is described. The sigma monitor calculates a weighted sum of squared deviations referred to as the discriminator for one or several reference receiver for a specific time period. The sigma monitor also calculates an alert threshold based on the chi-square or near chi-square probability distributions for one or several reference receivers and for the specific time period. The sigma monitor then compares the discriminator with the alert or alarm threshold. If the discriminator is greater than the alert or alarm threshold, an alert or alarm is issued and logged.

26 Claims, 4 Drawing Sheets

OTHER PUBLICATIONS

Shively, Curtis A., "Preliminary Analysis of Requirements for Cat IIIB LAAS" The MITRE Corporation, Center for Advanced Aviation System Development, McLean, VA 22102.

United States Department of Transportation Federal Aviation and Administration, Specification FAA-E-2937A, Category I, Local Area Augmentation System Ground Facility, Apr. 17, 2002.

Warbuton, John et al., "Validation of the FAA LAAS Specification Using the LAAS Test Prototype (LTP)".

* cited by examiner

LAAS GROUND FACILITY SIGMA MONITOR

FIELD

The present invention relates generally to satellite navigational systems, and more particularly, relates to a Local Area Augmentation System (LAAS) ground facility sigma monitor. Local Area Augmentation Systems are internationally referred to as Ground Based Augmentation Systems (GBAS).

BACKGROUND

A global positioning system (GPS) measures a three-dimensional, global position of a radio receiver, using distances between the radio receiver and a number of earth-orbiting satellite transmitters. The receiver, usually mounted to a vehicle such as a commercial passenger aircraft, receives signals from the satellite transmitters at one or several different frequencies, such as L1, L2, and L5. Each signal indicates both the position of its transmitter and its transmission time, enabling the receiver, equipped with its own clock, to determine signal transit times and to estimate the distances to the transmitters.

A processor coupled to the receiver uses at least four of these distances, known as pseudoranges, to approximate or estimate the position of the receiver and the associated vehicle. The accuracy of these estimates, or position solutions, depends on a number of factors, such as changing atmospheric conditions and performance of individual satellite transmitters. If measurements based on several frequencies are used, ionospheric delay can be estimated and compensated for so that the pseudorange measurements are more accurate.

In commercial aircraft navigation and guidance, global positioning systems have traditionally only been used for determining position of an aircraft during non-critical portions of a flight, that is, between takeoff and landing. However, in recent years, researchers have started extending global positioning systems for use during landings. These extended systems have taken the form of ground-augmented or differential global positioning systems which typically include two to four ground-based GPS receivers, a ground-based differential correction processor (DCP), and a correction-data transmitter, all located in the vicinity of an aircraft landing area.

In 1998, the Federal Aviation Administration (FAA) initiated a program for developing and deploying such a navigational system known as the GPS-based Local Area Augmentation System, or GPS-based LAAS. As a result of this program, the FAA released Specification, FAA-E-2937A (Apr. 17, 2002), which establishes the performance requirements for a Category I LAAS Ground Facility (LGF) in the LAAS. Under this specification, the LGF monitors the satellite constellation; and provides LAAS corrections, integrity data, and approach data to approaching aircraft.

The LAAS or GBAS is a differential global positioning system (DGPS). The DGPS includes GPS and at least one ground station. As stated above, the GPS uses a number of orbiting position transmitting satellite stations and a receiver on an aircraft to determine the position of the aircraft with respect to ground. With the received satellite information, the receiver can determine the horizontal position, speed, and altitude of the aircraft. By adding a ground station, the DGPS can correct errors in the signal or the data transmitted by a satellite. As a result, the DGPS can determine the position of an aircraft with a high degree of accuracy.

The ground-based GPS receivers, each with a known position, work as typical GPS receivers in determining respective sets of pseudorange measurements based on signals from at least four earth-orbiting satellite transmitters. These pseudorange measurements may be calculated based on carrier phase and/or code phase information from one or several signal frequencies, such as L1, L2, or L5. These measurements are fed to the ground-based DCP, which uses the measurements and the known positions of the ground receivers to determine differential correction data. A correction-data transmitter then transmits the differential correction data to aircraft approaching the landing area. These approaching aircraft use the differential correction data to correct the corresponding pseudorange measurements of the on-board GPS receivers, providing better position solutions than possible using their on-board GPS receivers alone.

The corrected position solutions are then compared to a reference landing path to determine course deviations necessary to ensure that the aircraft follows the reference landing path. The course deviations are either provided to an autopilot system, which guides the aircraft during automatic landings, or displayed to the pilot. For either an autopilot based system or a manually controlled aircraft to function within safety limits set by the FAA, the position estimates are required to stay within minimum accuracy limits known as vertical and lateral alert limits.

The LGF broadcasts 1-sigma pseudorange ground (sigma_pr_gnd) values to the aircraft, which are used to calculate the vertical and lateral protection limits (or levels). These protection limits are used to monitor the airplane's vertical and horizontal position integrity and are directly tied to the safety of the airplane. Failure to stay within the specified alert limits should result in the issuance of an alert, signaling a pilot to abort the landing and to restart the landing process.

If the broadcast sigma_pr_gnd values do not reflect actual errors (i.e., the sigma_pr_gnd values are too small) the pilot may not receive an alert. Therefore, it would be beneficial for the LGF to monitor the actual sigma_pr_gnd values to ensure that the broadcast sigma_pr_gnd value is equal to or larger than the actual sigma_pr_gnd value.

SUMMARY

The present invention provides a method and system for monitoring actual sigma_pr_gnd values versus expected sigma_pr_gnd values. The sigma monitor obtains differential correction data from all available satellites and ground reference receivers for a given time period. The differential correction data may or may not be carrier smoothed. Carrier smoothing means that the code-based pseudorange measurements are propagated based on the carrier phase and then filtered by a first or higher order linear filter with a time constant in the range 0.5–100 seconds. If the data used to form the differential corrections have been carrier smoothed, causing samples to be correlated in time, fewer independent samples are available.

For each satellite and reference receiver, the sigma monitor calculates an observable (also referred to as a deviation) and an expected 1-sigma value of this observable. The expected 1-sigma value may be based on several parameters, such as signal to noise ratio, S/No, number of satellites, N, number of ground receivers, M, elevation, $\lambda$, and azimuth, $\mu$. For each satellite and reference receiver, the sigma monitor normalizes the observable. The observable is normalized by dividing the observable with an expected deviation 1-sigma value.

A discriminator is then calculated as a weighted sum of squared normalized deviations. The discriminator is a chi-squared or near chi-squared distributed discriminator. A chi-squared distribution results if the normalized observables are not correlated, while a near chi-square distribution results if the normalized observables are correlated.

The discriminator calculation combines all the available pseudorange measurements. This means that a measurement from a satellite is included regardless of the number of satellites N, the signal to noise ratio S/No, the azimuth µ, the elevation λ, or any other parameter used for determining the expected deviation 1-sigma and broadcast sigma_pr_gnd value. By combining all measurements, a statistically significant number of independent samples are obtained. This method of calculating the discriminator results in an increased confidence level.

An alert and/or alarm threshold applicable to one or several reference receivers over a specific time period is then calculated. The sigma monitor then compares the chi-squared or near chi-squared distributed discriminator with the alert and/or alarm threshold. If the discriminator is greater than the threshold, an alert and/or an alarm are issued. The FAA specification sets the levels for the alert and alarm thresholds; however, the threshold levels could be any user defined level.

The given time period over which the sigma monitor obtains differential correction data can be two minutes, fifteen minutes, thirty minutes, one hour, one day, one month, or one year, for example. By monitoring measurements that are smoothed by a shorter (e.g., 0.5 seconds) time constant or not smoothed at all (unsmoothed), more independent measurements can be obtained. In this case, rapid changes in the environment may be detected. Such short time frame monitoring provides "time to detect" levels previously not thought possible in the industry.

These as well as other aspects and advantages will become apparent to those of ordinary skill in the art by reading the following detailed description with reference, where appropriate, to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
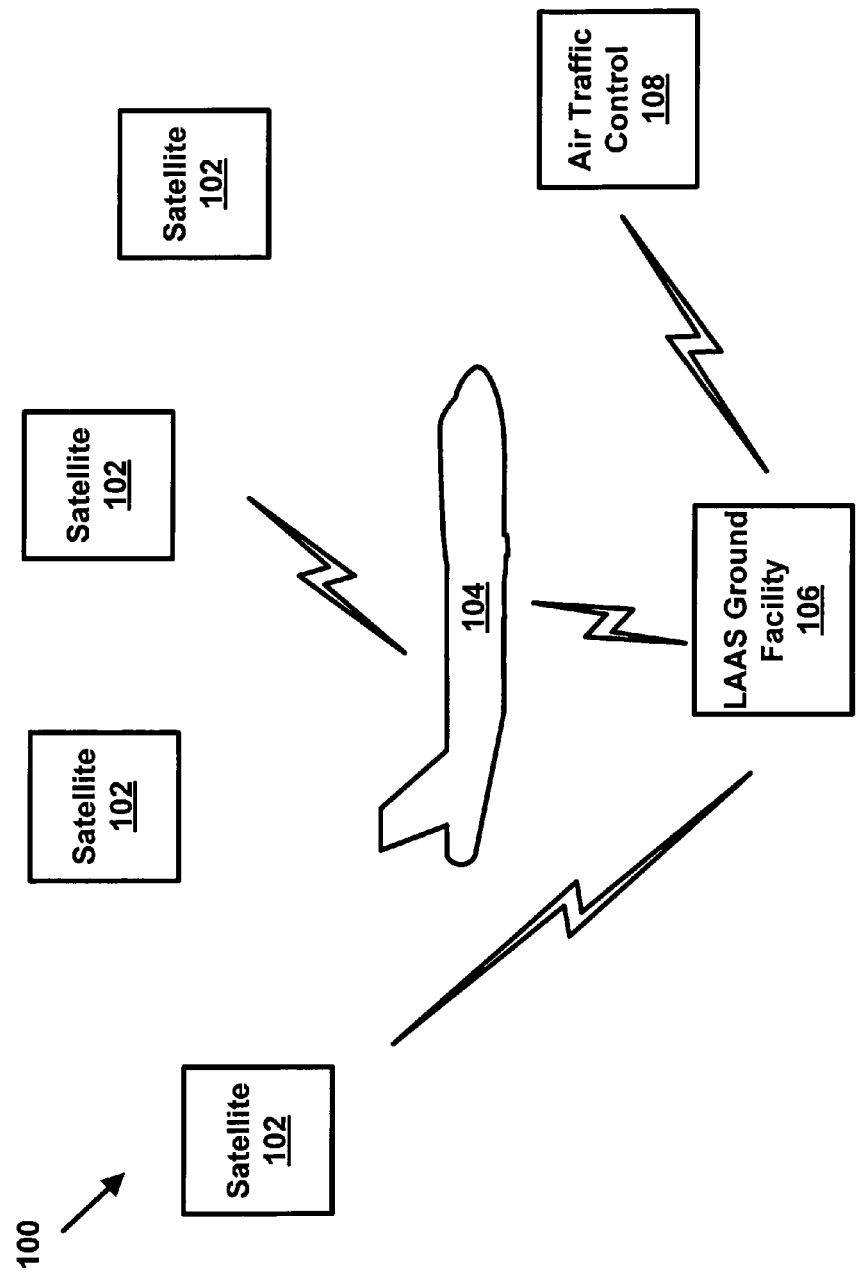
FIG. 1 is a pictorial representation of a Local Area Augmentation System, which augments a global positioning satellite system to a differential global positioning satellite system, according to an example.

FIG. 1 is a pictorial representation of a Local Area Augmentation System (LAAS) 100, which augments a global positioning satellite (GPS) system to a differential global positioning system (DGPS). The LAAS 100 includes a plurality of satellites 102 and a LAAS Ground Facility (LGF) 106 for providing precision approach data to an aircraft 104. While FIG. 1 depicts four satellites, the plurality of satellites 102 may include any number of satellites currently orbiting the earth and any new satellites that are installed in the future. The LAAS 100 may also include additional components not depicted in FIG. 1.

The satellites 102 may provide the aircraft 104 and the LGF 106 with GPS ranging signals and orbital parameters. The LGF 106 may provide differential corrections, integrity parameters, and precision approach path point data to the aircraft 104. For example, the LGF 106 provides sigma_pr_gnd values to the aircraft 104. The aircraft 104 may apply the LGF differential corrections to the GPS ranging signals to accurately determine its position. Additionally, the aircraft 104 may use the sigma_pr_gnd values to calculate vertical and lateral protection levels, as defined by the FAA.

The aircraft 104 may use an on-board GPS receiver(s) (not shown) to receive the ranging signals and to calculate an estimate of its position. Communication between the LGF 106 and the aircraft 104 may be conducted using Very High Frequency (VHF) Data Broadcast (VDB).

In addition, the LGF 106 may provide status information to air traffic control 108 via an Air Traffic Control Unit (ATCU). The ATCU provides air traffic controllers with LGF status information and runway control capabilities. For maintenance purposes, LGF status information may also be available on a Local Status Panel (LSP).

Figure 2:
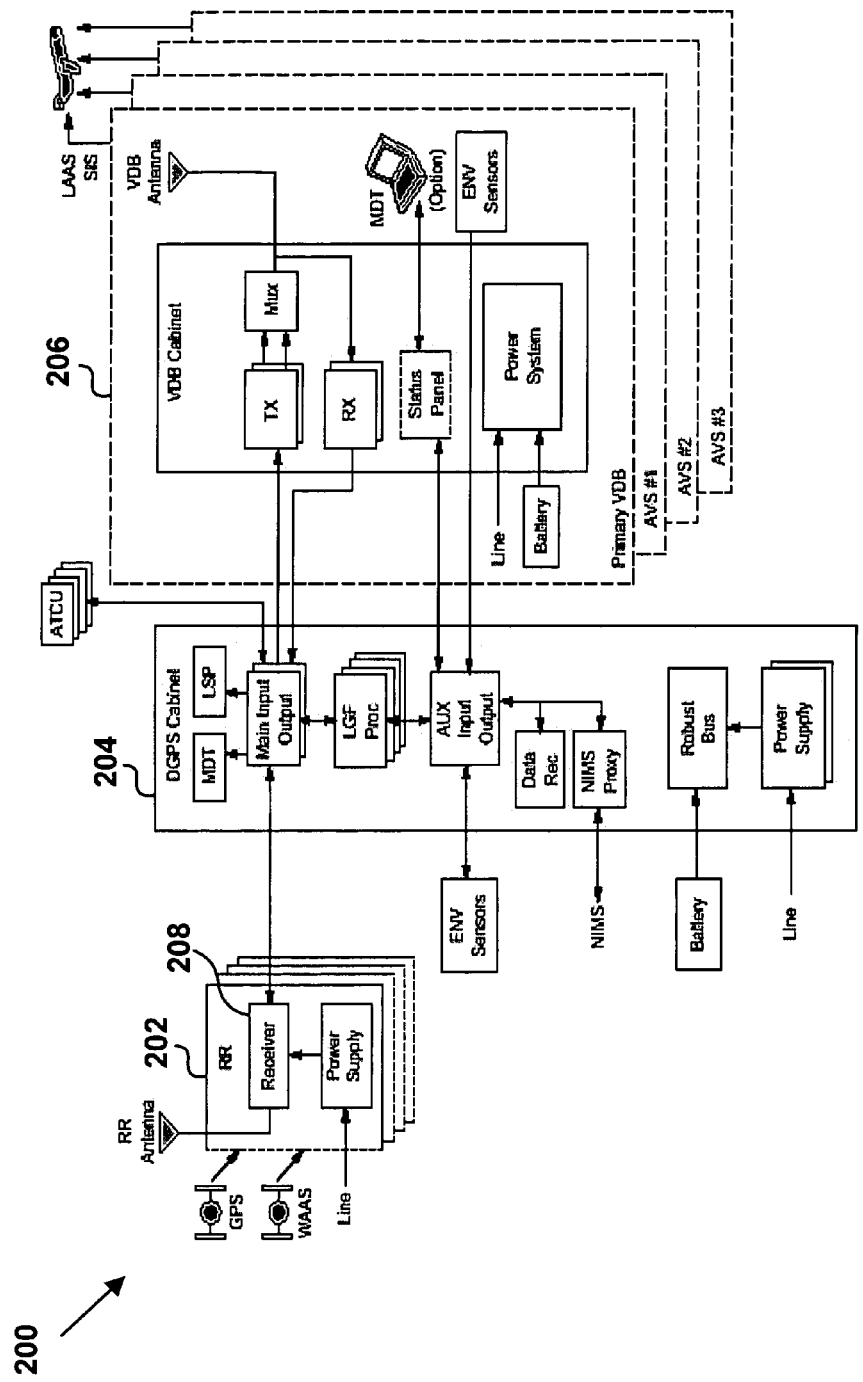
FIG. 2 is a block diagram of a Local Area Augmentation System Ground Facility, according to an example.

FIG. 2 depicts a block diagram of an LGF 200. The LGF 200 includes at least two reference receivers 202, a DGPS Cabinet 204, and at least one VDB Cabinet 206. The LGF 200 may include additional components not depicted in FIG. 2.

The reference receiver 202 includes a receiver 208 that obtains information from the satellites 102 using one or more antennas. The receiver 208 may include multiple channels to simultaneously track signals from the satellites 102. Typically, the receiver 208 includes five to twenty-four tracking channels, but may include more or less depending on its design. Each tracking channel includes a tracking function, which may include a code tracking loop and a carrier tracking loop. The code tracking loop may operate to keep an incoming satellite code in phase with a replica code generated at the receiver 208, while the carrier tracking loop may operate to keep the incoming satellite carrier signal in phase and/or frequency with a replica carrier signal. The reference receiver 202 may also include a power supply and additional components not depicted in FIG. 2.

The DGPS Cabinet 204 may communicate with the reference receiver 202, the ATCU, the VDB Cabinet 206, environmental sensors, and a National Airspace System (NAS) Infrastructure Management System (NIMS). The DGPS Cabinet 204 may include a Maintenance Data Terminal (MDT), an LSP, an Input/Output controller, a processor, an auxiliary Input/Output controller, a data recorder, a NIMS proxy, and other operational devices, such as memory and power supplies. The DPGS Cabinet 204 may include additional components not depicted in FIG. 2.

The VDB Cabinet 206 may communicate with the DGPS Cabinet 204 and the aircraft 104. The VDB Cabinet 206 may include a transmitter, a receiver, a multiplexer, a status panel, and a power system. The VDB Cabinet 206 may include additional components not depicted in FIG. 2.

The requirements applicable to the LGF 200 are documented in the FAA released Specification, FAA-E-2937A, for a Category I LGF on Apr. 17, 2002, the contents of which are incorporated by reference. According to the LGF Specification, the LGF shall broadcast a sigma_pr_gnd value for each available satellite. The LGF Specification further requires the LGF 200 to detect conditions that result in a noncompliance with respect to the broadcast sigma_pr_gnd requirements.

According to the LGF specification, when the increase in system risk associated with degraded performance is minimal, but exceeds design tolerances, the LGF 200 is to initiate a service alert. However, when the increase in system risk is not minimal, the LGF 200 is to exclude the offending reference receiver or generate an alarm, as appropriate. The LGF specification further requires that the LGF 200 performance be computed using the following sets of data: data over one hour and trend of hourly results over one day; data over one day and trend of daily results over one month; data over one month and trend of monthly results over one year, and since initialization.

Figure 3:
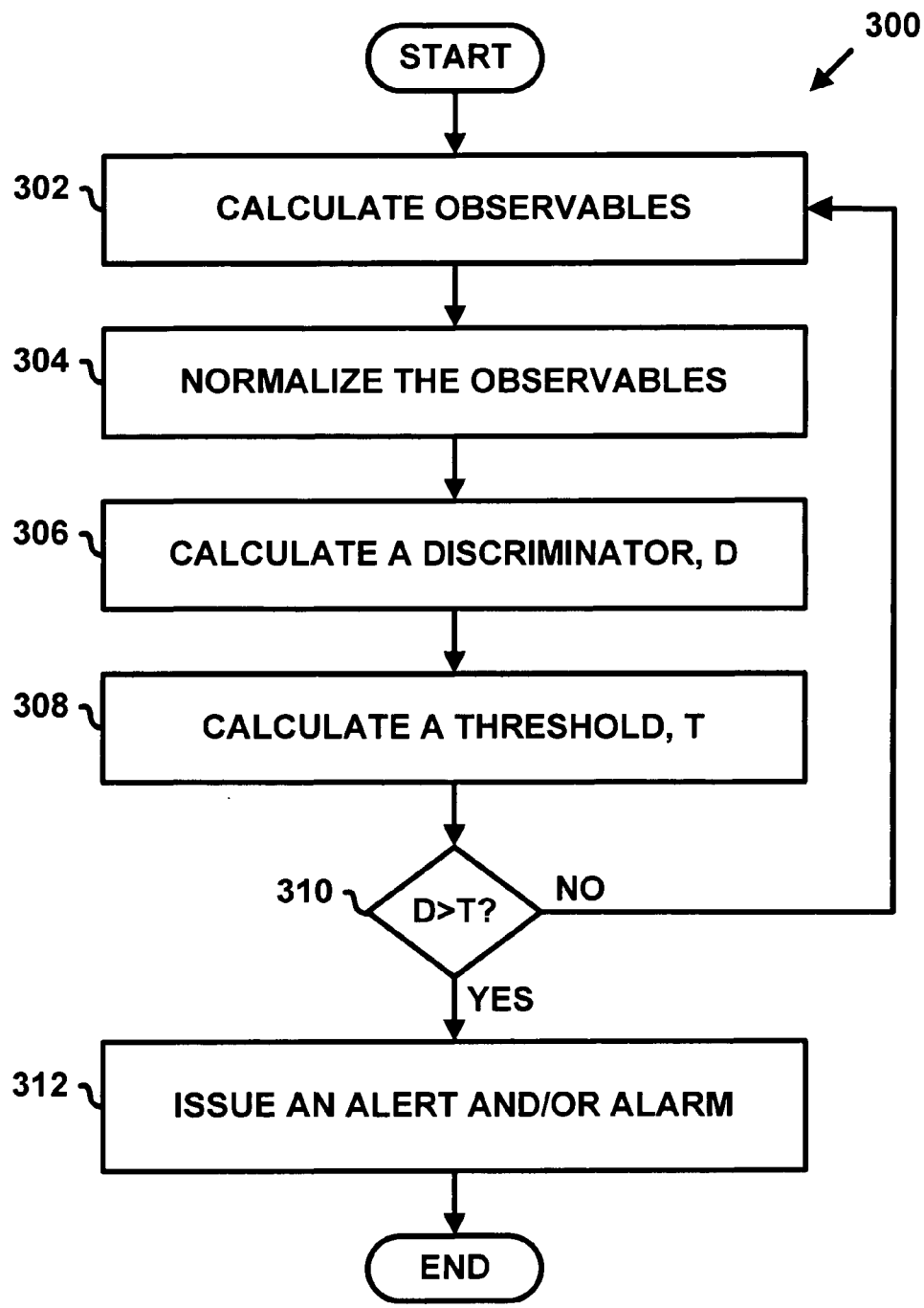
FIG. 3 is a flow chart of a method for monitoring actual sigma_pr_gnd values versus expected and broadcast sigma_pr_gnd values, according to an example.

FIG. 3 is a flow diagram of a method 300 for monitoring actual sigma_pr_gnd values versus expected sigma_pr_gnd values. The method 300 uses normalized deviations to calculate a discriminator d that reflects a ratio between the actual sigma_pr_gnd value and the expected sigma_pr_gnd value. A difference between an actual sigma_pr_gnd value and an expected sigma_pr_gnd value may occur due to errors.

One such error is a measurement error that is caused by satellite signals that bounce off objects in the vicinity of an antenna (multipath environment). The objects may be small, such as a pebble or a leaf, or large, such as trucks, fences, and buildings. This phenomenon is referred to as signal multipath. Changes in the actual sigma_pr_gnd value detected by the signal monitor may be due to changes in the multipath environment.

Other errors may be attributed to antenna design. For example, an antenna may add azimuth and elevation dependent errors caused by changes in the satellite signal group delay. This phenomenon is referred to as phase center variation. To prevent the phase center variation from affecting the sigma monitoring, an observable is formed based on differences between differential corrections obtained from different reference receivers as described below. The phase center variation is approximately the same on each reference receiver antenna and thus, this error may cancel in the observable. Other common errors that may also cancel are satellite clock errors, residual troposphere delays, and residual ionosphere delays.

At block 302, observables are calculated. The observables may be calculated using carrier smoothed differential correction data or differential correction data that is not carrier smoothed. More specifically the observable $DEV_{sv}^i$, for reference receiver i and for satellite sv may be calculated as:

$$DEV_{sv}^i = PRsca_{sv}^i - PRcorr_{sv} \qquad \text{(Equation 1)}$$

where $PRsca_{sv}^i$ is the carrier smoothed and receiver clock adjusted pseudorange correction of satellite sv from reference receiver i; and $PRcorr_{sv}$ is the broadcast correction of satellite sv formed as the average over all reference receivers as shown in Equation 2.

$$PRcorr_{sv} = \frac{1}{M}\sum_{k=1}^{M} PRsca_{sv}^k \qquad \text{(Equation 2)}$$

$DEV_{sv}^i$ is the deviation from the mean and thus, may be referred to as the deviation for satellite sv on reference receiver i.

At block 304, the observables or deviations calculated at block 302 are normalized by the expected deviation 1-sigma value $\sigma dev_{sv}^i$, which is calculated as described below.

$$NDEV_{sv}^i = \frac{DEV_{sv}^i}{\sigma dev_{sv}^i} \qquad \text{(Equation 3)}$$

The $\sigma dev_{sv}^i$ is the expected 1-sigma value of the carrier smoothed deviations from reference receiver i and satellite sv. The $\sigma dev_{sv}^i$ calculation may include a compensation for signal to noise ratio in real time. This normalization may remove azimuth, elevation, and/or signal to noise ratio dependence.

The expected deviation 1-sigma value may be calculated as follows.

$$\sigma dev_{sv}^i = \sqrt{\left(\frac{(M-1)\sigma_{c^i sv}}{M}\right)^2 + \sum_{m=1,m\neq i}^{M}\left(\frac{\sigma_{c^m sv}}{M}\right)^2} \qquad \text{(Equation 4)}$$

In Equation 4, M is the number of reference receivers with satellite sv as a measurement ranging source. Also in Equation 4, $\sigma_{c^i sv}$ is the 1-sigma value for the error in the differential correction for satellite sv on reference receiver i; and $\sigma_{c^m sv}$ is the 1-sigma value for the error in the differential correction for satellite sv on reference receiver m, where m is not equal to i.

The 1-sigma value for the error in the differential correction for satellite sv may be calculated depending on whether the satellite is tracked on all reference receivers or not. When the satellite is tracked on all reference receivers, the satellite is described as COMMON. When sv is COMMON, the 1-sigma value for the error in the differential correction for satellite sv may be calculated as follows.

$$\sigma_{c^i sv} = \sqrt{\left(\frac{(N-1)}{N}\right)^2 (\sigma_{w^i sv})^2 + \sum_{n=1,n\neq sv}^{N}\left(\left(\frac{1}{N}\right)^2 (\sigma_{w^i n})^2\right)} \qquad \text{(Equation 5)}$$

When sv is not COMMON, the 1-sigma value for the error in the differential correction for satellite sv may be calculated as follows.

$$\sigma_{c^i sv} = \sqrt{(\sigma_{w^i sv})^2 + \sum_{n=1}^{N}\left(\left(\frac{1}{N}\right)^2 (\sigma_{w^i n})^2\right)} \qquad \text{(Equation 6)}$$

In Equations 5 and 6, N is the number of COMMON satellites; $\sigma_{w^i sv}$ is the expected 1-sigma value of the basic error in satellite sv on reference receiver i; and $\sigma_{w^i n}$ is the expected 1-sigma value of the basic error in satellite n on reference receiver i, where n is not equal to sv. Note that the validity of the 1-sigma value for the expected basic error $\sigma_{w^i sv}$ is what ultimately is monitored and $\sigma_{w^i sv}$ is in turn used to calculate the broadcast sigma_pr_gnd.

The expected basic 1-sigma value may be calculated as follows.

$$\sigma_{w^i{}_{sv}} = \sqrt{(\sigma_{s2n^i sv})^2 + (\sigma_{(azimuth,elevation)^i{}_{sv,na}})^2} \quad \text{(Equation 7)}$$

In Equation 7, $\sigma_{s2n^i{}_{sv}}$ is the 1-sigma value of the signal to noise dependent error for satellite sv on reference receiver i, which can be calculated as follows.

$$\sigma_{s2n^i sv} = CHIP \cdot \sqrt{\frac{B \cdot CORRELATOR\_SPACING}{(2 \cdot s2np)}} \quad \text{(Equation 8)}$$

Equation 8 could have included higher order terms, such as a squaring loss term. In Equation 8, CHIP is the reference receiver correlator chip size (e.g., 293.0523 meters) and B is the one-sided bandwidth. For example, using a smoothing time constant τ of 100 seconds, the one-sided bandwidth is $1/(\tau*4)$ or $2.5 \times 10^{-3}$ Hz. CORRELATOR_SPACING is the spacing between early and late correlator points measured in CHIP (e.g. 0.1). The signal to noise power ratio, s2np, may be defined as follows.

$$s2np = 10^{\frac{s2n^i_{sv}}{10}} \quad \text{(Equation 9)}$$

where $s2n^i_{sv}$ is the signal to noise ratio of satellite sv on reference receiver i in dB-Hz.

Returning to Equation 7, the function $\sigma^{pr}(\text{azimuth,elevation})_{sv,na}{}^i$ is the azimuth and elevation based expected 1-sigma value of the carrier smoothed multipath noise for reference receiver i and satellite sv on antenna na(1,2) measured at installation of the LGF 200. The function may be stored in memory as a two dimensional array of real numbers and each value $\sigma_{pr}(\text{azimuth,elevation})^i_{sv,na}$ may be obtained by linear or semi-linear interpolation. Note that a switch between antennas may be elevation dependent such that na=1 for elevations less than or equal to some elevation switch angle λ, and na=2 for elevations above λ.

Let $\sigma_{pr}(\text{azim}(i),\text{elev}(j))^m_{sv,na}$ be an array of values stored in memory. One means of calculating the function $\sigma_{pr}(\text{azimuth,elevation})^m_{sv,na}$, assuming that azim(i-1) ≦azimuth≦azim(i) and elev (j-1)≦elevation≦elev(j) is as follows.

$\sigma_{pr}(\text{azimuth,elev}(j-1))^m_{sv,na} = \sigma_{pr}(\text{azim}(i-1),\text{elev}(j-1))^m_{sv,na} + \text{delt*slope}$ (Equation 10)

where the slope=$(\sigma_{pr}(\text{azim}(i),\text{elev}(j-1))^m_{sv,na} - \sigma_{pr}(\text{azim}(i-1),\text{elev}(j-1))^m_{sv,na})/(\text{azim}(i)-\text{azim}(i-1))$ and delt=azimuth−azim(i−1). Likewise:

$\sigma_{pr}(\text{azimuth,elev}(j-1))^m_{sv,na} = \sigma_{pr}(\text{azim}(i-1)\text{elev}(j))^m_{sv,na} + \text{delt*slope}$ (Equation 11)

where slope=$(\sigma_{pr}(\text{azim}(i),\text{elev}(j))^m_{sv,na} - \sigma_{pr}(\text{azim}(i-1),\text{elev}(j))^m_{sv,na})/(\text{azim}(i)-\text{azim}(i-1))$ and delt=azimuth−azim(i−1). And finally:

$\sigma_{pr}(\text{azimuth,elevation})^m_{sv,na} = \sigma_{pr}(\text{azim}(i-1))^m_{sv,na} + \text{delt*slope}$ (Equation 12)

where slope=$\sigma_{pr}(\text{azimuth,elev}(j))^m_{sv,na} - \sigma_{pr}(\text{azimuth,elev}(j-1))^m_{sv,na})/(\text{elev}(j)-\text{elev}(j-1))$ and delt=elev−elev(j−1). If there is no azimuth dependence, this algorithm reduces to standard linear interpolation for elevation.

At block 306, a chi-squared or near chi-squared distributed discriminator $d^i(q)$ is calculated for a reference receiver i and time period q. The discriminator $d^i(q)$ may be calculated as a weighted sum as follows.

$$d^i(q) = \frac{\sum_{k=1}^{K(q)(i)} SNDEV2^i(q)(k)}{\sum_{k=1}^{K(q)(i)} N(k)} \quad \text{(Equation 13)}$$

In Equation 13, K(q)(i) is the number of samples in the time period q for reference receiver i; N(k) is the number of valid satellites tracked by the reference receiver i at sample k; and $SNDEV2^i(q)(k)$ is the sum of the squared normalized deviations for reference receiver i across all satellites at sample k and time period to sum over q. For example, the time period to sum over q may be every second, every minute, every hour, every day, every month, and so on. The division by $$\sum_{k=1}^{K(q)(i)} N(k)$$

in Equation 13 is referred to as weighting and ensures that the mean of the distribution stays at 1. $SNDEV2^i(q)(k)$ may be expressed as follows.

$$SNDEV2^i(q)(k) = \sum_{sv=1}^{N(i)} NDEV^{i2}_{sv} \quad \text{(Equation 14)}$$

In Equation 14, $NDEV_{sv}{}^i$ is the normalized deviation for reference receiver i and satellite sv (see Equation 3).

Equation 13 is applicable to a specific reference receiver i. When the discriminator is formed as a sum of squared deviations over all or some of the reference receivers from i=1 to i=M, the discriminator for time period q is defined as follows.

$$d(q) = \frac{\sum_{i=1}^{M} d^i(q)}{M} \quad \text{(Equation 15)}$$

At block 308, a near chi-squared alert and/or alarm threshold, $T_{alert}(q)(i)$ is calculated for reference receiver i for time period q. The near chi-squared alert threshold may be calculated as follows. Let $f_{\chi^2}(x)$ be the chi-square probability density for v degrees of freedom.

$$f_{\chi 2}(x) = [2^{v/2}\Gamma(v/2)]^{-1} \int_0^x t^{(v/2-1)} e^{-t/2} dt \quad \text{(Equation 16)}$$

In this expression, I(x) is the Gamma Function, which is defined as follows.

$$\Gamma(x) = \int_0^\infty t^{x-1} e^{-t} dt$$

If squared and summed deviations are correlated (e.g., between a pair of satellites and/or a pair of receivers) the resulting near chi-square probability density f(x) will deviate from the chi-square probability density for v degrees of freedom.

$$f(x)=f_{\chi^2}(x)+\epsilon(x) \quad \text{(Equation 17)}$$

Without a closed form expression for the near chi-square probability density function, the deviation $\epsilon(x)$ may be calculated based on Monte Carlo simulation. The near chi-square probability density f(x) or the deviation $\epsilon(x)$ may be represented as an array of real numbers f(x(n)) or $\epsilon$(x(n)) and f(x) or $\epsilon$(x) obtained by linear interpolation. If x(n−1) ≦x≦x(n), then:

$$f(x)=f(x(n-1))+(x-x(n-1))[f(x(n))-f(x(n-1))]/[x(n)-x(n-1)]. \quad \text{(Equation 18)}$$

$T_\alpha^v$ is the near chi-square threshold for v degrees of freedom and $p_\alpha$ the probability of a false alert and/or alarm. For an α value of 0, $T_\alpha$ corresponds to $T_{alarm}$. For an α value of 1, $T_\alpha$ corresponds to $T_{alarm}$. The threshold $T_\alpha^v$ is set so that $$\int_{T_\alpha^v}^\infty f(x) dx = p_\alpha. \quad \text{(Equation 19)}$$

This equation is of the form $g(T_\alpha^v)=0$ and can be solved by using traditional methods for finding roots such as Regula Falsi or Newton-Rapson. The degrees of freedom v varies with the time period q and the number of satellites visible N(k). The function $T_\alpha^v$ can be calculated in real time using the following approximation.

$$T_\alpha^v = \sum_{k=0}^{Kord} coef_\alpha(k) \cdot v^k \quad \text{(Equation 20)}$$

In Equation 20, $coef_\alpha(k)$ from k=0 to Kord are the coefficients used in the curve fit polynomial. Alternatively, Equation 19 can be solved for each v in real time given adequate processing power.

As described above, q is a time period to sum over, such as sixty minutes (one hour), twenty-four sixty-minute periods (one day), thirty-day periods (one month), or twelve-month periods (one year). Also in Equation 20, $T_\alpha^v$ is the threshold level corresponding to either a false alert and/or a false alarm probability, and Kord is the order of the least squares curve fit polynomial (e.g., 6). Additionally, v in Equation 20 is the number of degrees of freedom. The number of degrees of freedom v can be calculated as follows.

$$v=NS(q)(i)/s, \text{ where } s=\tau_{corr}/T_m. \quad \text{(Equation 21)}$$

In Equation 21, NS(q)(i) is the total number of samples for time period q for reference receiver i; s is a factor to convert to the number of independent samples; $\tau_{corr}$ is the estimated average time between uncorrelated samples; and $T_m$ is a filter sample interval (preferably equal to 0.5 seconds and not exceeding 1 second). It is now possible to determine the threshold for time period q and reference receiver i as follows.

$$T_\alpha(q)(i)=T_\alpha^v \quad \text{(Equation 22)}$$

At block 310, the discriminator d is compared to a threshold value T that is set based on the allowed false alert and/or alarm probability. Since the differential correction data has been smoothed, the deviations are correlated over time. This means that fewer statistically uncorrelated deviations are available than if smoothing did not occur. By forming the discriminator based on the normalized deviations from all available satellites and not attempting to restrict the statistical material to certain azimuths and elevations or specific satellites, the number of statistically uncorrelated normalized deviations is large enough to obtain a statistical confidence in the discriminator. The discriminator d may be formed for each reference receiver or over all reference receivers.

If the discriminator $d^i(q)$ is less than or equal to the near chi-squared alert threshold $T_{alert}(q)(i)$, the calculations of the discriminator $d^i(q)$ and the near chi-squared alert threshold $T_{alert}(q)(i)$ are repeated. However, if the discriminator $d^i(q)$ is greater than the near chi-squared alert threshold $T_{alert}(q)(i)$, then at block 312, an alert and/or alarm is issued. The alert and/or alarm may include an identification of the reference receiver i, the time period q, and/or the time t, at which the alert/alarm is issued.

The alert and/or alarm may be logged in memory in the LGF 200. The alert and/or alarm may comply with the requirements of the LGF specification. The LGF 200 may also exclude the offending reference receiver i. If the discriminator is formed over all or several reference receivers, the index i is dropped in Equations 21 and 22 and the criterion for an alert and/or alarm is that d(q) is greater than $T_{alert}(q)$ or d(q) is greater than $T_{alarm}(q)$.

Discriminators for each subsequent time period q(n) are the sum of the discriminators for previous time period, q(n−1). For example, the sum of the last twenty-four one-hour discriminators is the one day discriminator. This can be more easily seen in FIG. 4.

Figure 4:
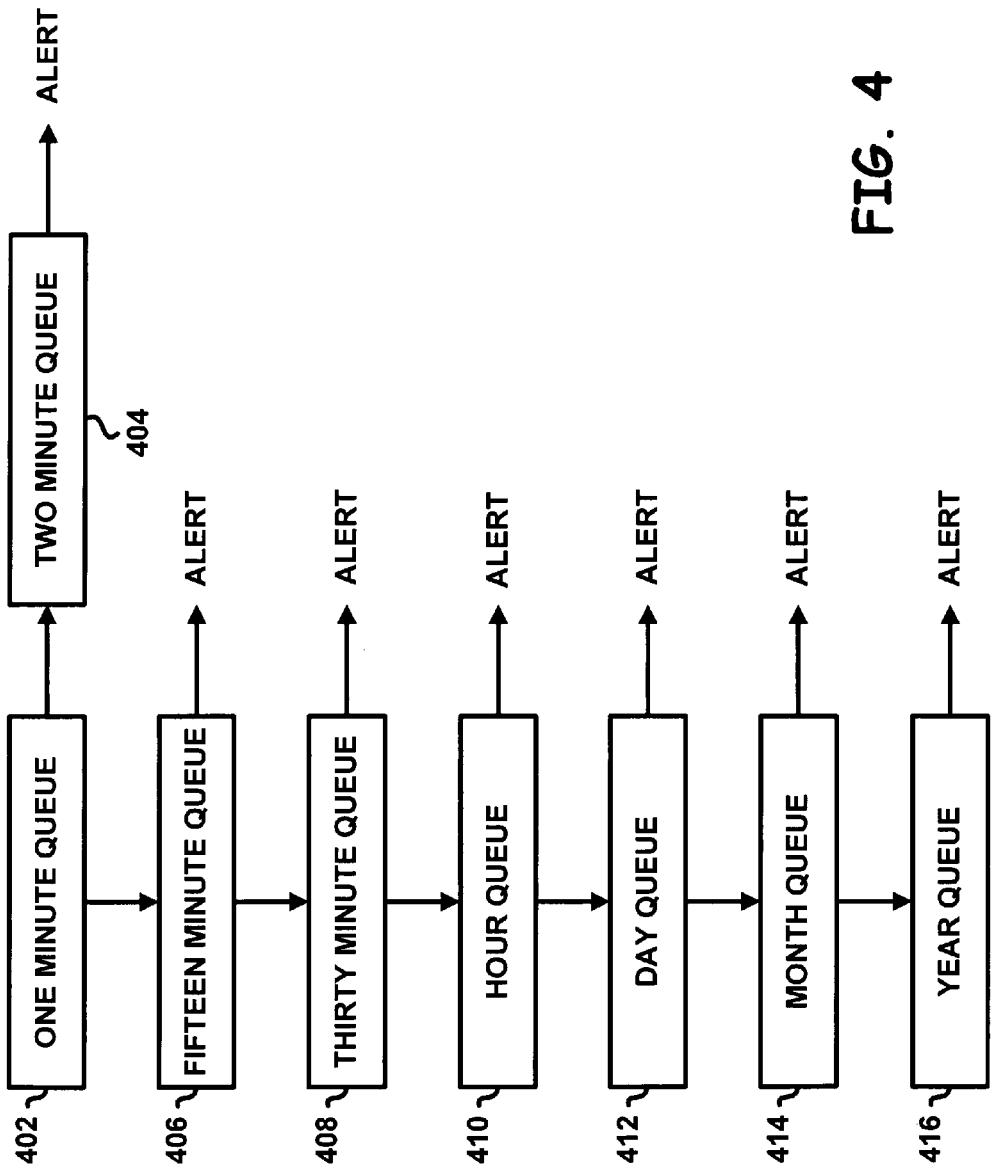
FIG. 4 is a block diagram depicting monitoring queues, according to an example.

FIG. 4 is a block diagram depicting monitoring queues. The LGF specification requires that the sigma_pr_gnd value be monitored over one hour, one day, one month, and one year intervals. This type of monitoring is designed to catch changes in the environment or equipment affecting sigma_pr_gnd over long time frames. Such changes include seasonal changes, changes caused by landscaping, and construction near the antennas. However, it would be beneficial to monitor sigma_pr_gnd values more frequently to detect changes that occur more quickly, such as changes due to localized flooding or freezing rain.

The FAA has defined a landing as a two and a half minute interval, so monitoring sigma_pr_gnd values as frequently as every two minutes may be beneficial. As depicted in FIG. 4, a minimum time for detecting changes in the sigma_pr_gnd value is two minutes. The one minute queue 402 is fed into both a two minute queue 404 and a fifteen minute queue 406. If after two minutes, the discriminator $d^i(q)$ is greater than the weighted chi-squared alert threshold $T_{alert}(q)(i)$, then an alert is logged. By using a smaller time constant for smoothing and performing monitoring at least every two minutes, the sigma_pr_gnd value may be checked for every landing.

The fifteen minute queue 406 is fed into a thirty minute queue 408. The thirty minute queue 408 is fed into an hour queue 410. The hour queue 410 is fed into a day queue 412. The day queue 412 is fed into a month queue 414. The month queue 414 is fed into a year queue 416. If the discriminator $d^i(q)$ is greater than the near chi-squared alert threshold $T_{alert}(q)(i)$ for any of these time durations then an alert is logged.

While FIG. 4 shows that the monitoring queues 400 start at one minute, it is understood that virtually any amount of time may be used for monitoring the sigma_pr_gnd values. Further, alerts may be provided for sigma_pr_gnd values for less than a two minute interval and for more than a one year interval.

The sigma monitor may be a software implementation stored in memory in the LGF 200 in machine language format, which is executable by a processor also located in the LGF 200. The processor may be a general purpose processor and/or an application specific processor. The memory may include volatile and/or non-volatile memory devices. For example, the memory may be located on a memory chip on a printed circuit board.

The sigma monitor described herein may provide approximately ten times more confidence in the actual sigma_pr_gnd values than in previously published methods. This improvement in confidence level is related to the combination of data from all available azimuths and/or elevations. Additionally, by monitoring error measurements smoothed with a filter using a short time constant (e.g., 0.5 seconds) or not smoothed at all (unsmoothed) more frequently than required by the LGF specification (i.e., two minute, fifteen minute, and thirty minute intervals), rare threats, such as environmental changes caused by sudden flooding or ice storms, can be detected and appropriate actions taken.

Although the present invention has been described with reference to preferred embodiments, workers skilled in the art will recognize that changes may be made in form and detail without departing from the spirit and scope of the invention. In particular, those in the art will recognize that a single processor could perform all the operations for implementing the invention or that multiple processors could share these operations. Moreover, the method itself could be divided over distinct functional units other than those used for illustration here. Of course, other changes in form and detail are also within the spirit and scope of the invention.

The invention claimed is:

1. A method of monitoring 1-sigma pseudorange ground (sigma_pr_gnd) values, comprising in combination:
   calculating deviations from differential correction data;
   normalizing the deviations with an expected deviation 1-sigma value;
   calculating a discriminator as a weighted sum of squared normalized deviations for at least one reference receiver over a time period;
   calculating a near chi-squared alert threshold for the at least one reference receiver for the time period;
   comparing the discriminator with the near chi-squared alert threshold; and
   issuing an alert if the discriminator is greater than the near chi-squared alert threshold.

2. The method of claim 1, wherein the deviations are calculated from differential correction data that is carrier smoothed.

3. The method of claim 1, wherein the deviations are calculated from differential correction data that is not carrier smoothed.

4. The method of claim 1, wherein the deviations are normalized by dividing the deviations with the expected deviation 1-sigma value.

5. The method of claim 1, wherein the expected deviation 1-sigma value is calculated as follows:

$$\sigma dev_{sv}^i = \sqrt{\left(\frac{(M-1)\sigma_{c^i sv}}{M}\right)^2 + \sum_{m=1, m \neq i}^{M} \left(\frac{\sigma_{c^m sv}}{M}\right)^2}.$$

6. The method of claim 1, wherein the discriminator combines differential correction data from all available satellites over all available azimuths and elevations for the at least one reference receiver.

7. The method of claim 1, wherein the discriminator for the at least one reference receiver and the time period is calculated as follows:

$$d^i(q) = \frac{\sum_{k=1}^{K(q)(i)} SNDEV2^i(q)(k)}{\sum_{k=1}^{K(q)(i)} N(k)}.$$

8. The method of claim 1, wherein the discriminator for the at least one reference receiver and the time period is calculated as follows:

$$d(q) = \frac{\sum_{i=1}^{M} d^i(q)}{M}.$$

9. The method of claim 1, wherein the time period is less than a two and a half minute interval.

10. The method of claim 1, wherein the near chi-squared alert threshold is calculated as follows:

$$T_\alpha^v = \sum_{k=0}^{Kord} coef_\alpha(k) \cdot v^k.$$

11. The method of claim 1, wherein the alert includes an identification of the at least one reference receiver and the time period.

12. The method of claim 1, further comprising calculating a near chi-squared alarm threshold and issuing an alarm if the discriminator is greater than the alarm threshold.

13. The method of claim 1, further comprising excluding the at least one reference receiver.

14. A system for monitoring 1-sigma pseudo range ground (sigma_pr_gnd) values, comprising in combination
   a processor;
   data storage; and
   machine language instructions stored in the data storage executable by the processor to:
      calculate deviations from differential correction data;
      normalize the deviations with an expected deviation 1-sigma value;

calculate a discriminator as a weighted sum of squared normalized deviations for at least one reference receiver over a time period;

calculate a near chi-squared alert threshold for the at least one reference receiver for the time period;

compare the discriminator with the near chi-squared alert threshold; and issue an alert if the discriminator is greater than the alert threshold.

15. The system of claim 14, wherein the deviations are calculated from differential correction data that is carrier smoothed.

16. The system of claim 14, wherein the deviations are calculated from differential correction data that is not carrier smoothed.

17. The system of claim 14, wherein the deviations are normalized by dividing the deviations with the expected deviation 1-sigma value.

18. The system of claim 14, wherein the expected deviation 1-sigma value is calculated as follows:

$$\sigma dev_{sv}^i = \sqrt{\left(\frac{(M-1)\sigma_{c^i sv}}{M}\right)^2 + \sum_{m=1, m \neq i}^{M} \left(\frac{\sigma_{c^m sv}}{M}\right)^2}.$$

19. The system of claim 14, wherein the discriminator combines differential correction data from all available satellites over all available azimuths and elevations for the at least one reference receiver.

20. The system of claim 14, wherein the discriminator for the at least one reference receiver and the time period is calculated as follows:

$$d^i(q) = \frac{\sum_{k=1}^{K(q)(i)} SNDEV2^i(q)(k)}{\sum_{k=1}^{K(q)(i)} N(k)}.$$

21. The system of claim 14, wherein the discriminator for the at least one reference receiver and time period is calculated as follows:

$$d(q) = \frac{\sum_{i=1}^{M} d^i(q)}{M}.$$

22. The system of claim 14, wherein the time period is less than a two and a half minute interval.

23. The system of claim 14, wherein the weighted near chi-squared alert threshold is calculated as follows:

$$T_\alpha^v = \sum_{k=0}^{Kord} coef_\alpha(k) \cdot v^k.$$

24. The system of claim 14, wherein the alert includes an identification of the at least one reference receiver and the time period.

25. The system of claim 14, further comprising machine language instructions to calculate a near chi-squared alarm threshold and issue an alarm if the discriminator is greater than the alarm threshold.

26. The system of claim 14, further comprising machine language instructions to exclude the at least one reference receiver.

* * * * *

UNITED STATES PATENT AND TRADEMARK OFFICE
CERTIFICATE OF CORRECTION

| | | |
|---|---|---|
| PATENT NO. | : 7,019,688 B1 | Page 1 of 1 |
| APPLICATION NO. | : 11/089156 | |
| DATED | : March 28, 2006 | |
| INVENTOR(S) | : Randy J. Reuter et al. | |

It is certified that error appears in the above-identified patent and that said Letters Patent is hereby corrected as shown below:

Col 7, line 34, delete "$\sigma^{pr}$", replace with -- $\sigma_{pr}$ --
Col 7, line 35, delete "$_{sv,na}^{i}$" replace with -- $\overset{\text{i}}{\phantom{.}}_{sv,na}$ --
Col 7, line 56, delete "(j-1))", replace with --(j)) --
Col 8, line 66, delete "I", replace with -- $\Gamma$ --
Col 9, line 26, delete "$T_{alarm}$", replace with -- $T_{alert}$ --

Signed and Sealed this

Twelfth Day of December, 2006

JON W. DUDAS
*Director of the United States Patent and Trademark Office*